(12) United States Patent
Beskrovny (10) Patent No.: US 12,061,690 B2
(45) Date of Patent: Aug. 13, 2024

(54) SECURITY ANNOTATION OF APPLICATION SERVICES

(71) Applicant: CyberArk Software Ltd., Petach-Tikva (IL)

(72) Inventor: Evgeny Beskrovny, Ramat Gan (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 1330 days.

(21) Appl. No.: 16/014,332

(22) Filed: Jun. 21, 2018

(65) Prior Publication Data

US 2019/0392137 A1    Dec. 26, 2019

(51) Int. Cl.
*G06F 21/54* (2013.01)
*G06F 21/55* (2013.01)

(52) U.S. Cl.
CPC ............ *G06F 21/54* (2013.01); *G06F 21/554* (2013.01); *G06F 2221/033* (2013.01)

(58) Field of Classification Search
CPC ........... G06F 21/51; G06F 21/54; G06F 21/60
See application file for complete search history.

(56) References Cited

U.S. PATENT DOCUMENTS

| | | | |
|---|---|---|---|
| 7,509,497 B2* | 3/2009 | Joy | G06F 21/54 713/172 |
| 8,595,287 B2 | 11/2013 | Chen et al. | |
| 11,044,271 B1* | 6/2021 | Kennedy | H04L 63/1408 |
| 2011/0030045 A1* | 2/2011 | Beauregard | G06F 21/44 709/229 |
| 2014/0123296 A1 | 5/2014 | Subramanian | |
| 2018/0121659 A1* | 5/2018 | Sawhney | G06F 21/566 |
| 2019/0171846 A1* | 6/2019 | Conikee | G06F 21/6245 |

* cited by examiner

*Primary Examiner* — Daniel B Potratz
(74) *Attorney, Agent, or Firm* — FINNEGAN, HENDERSON, FARABOW, GARRETT & DUNNER, LLP (57) ABSTRACT

Disclosed embodiments include systems, methods, and computer-readable media for maintaining and accessing security metadata associated with a micro service. Aspects include generating security metadata associated with a micro service. The security metadata may be separate from an executable portion of the micro service and define a plurality of security attributes of the micro service. Examples of security attributes include a security grade level for the micro service, a security sensitive operation that the micro service is programmed to perform, a function classification for the micro service, and an idempotence property for the micro service, among others. Aspects also include accessing the security metadata, and determining, based on the security metadata, whether to perform a control action of various different types for the micro service.

23 Claims, 6 Drawing Sheets

SECURITY ANNOTATION OF APPLICATION SERVICES

BACKGROUND

Micro services are a software paradigm where application functionality is partially implemented by two or more different sub-applications, or services. A core main process with several different functions may thus be performed using several different micro services.

Benefits of micro services include the ability to independently develop, maintain, and deploy each individual service. Developers may specialize in the particular function of a particular micro service and design the micro service to optimally perform that function. Further, micro services can be designed with a high degree of modularity, where one micro service may be used in different combinations with various other micro services to perform different functions. In a sense, a micro service can be considered a building block, which can be arranged in various different combinations and architectures with other blocks.

Nevertheless, the partition between micro services creates technical problems. For example, if an overall process is to be run in a hardened (e.g., security-enhanced) environment, it may be necessary to harden both the overall process itself and also the micro services individually. This is not possible in some situations, such as where micro services are deployed in a cloud environment or other network environment where the individual micro services are not directly controllable or configurable. Further, technical problems arise when a micro service is governed by a policy that does not permit modifying its state (e.g., based on prohibitions against saving data or code, updating data or code, or deleting data or code). Because of such prohibitions, it may be difficult or impossible to harden the micro services, which typically involves some degree of state changing for them. Consequently, it is often difficult to comprehensively harden environments that include micro services. Attempts to do so may be incomplete or defective, thus leading to security vulnerabilities and potential software runtime errors or bugs.

Accordingly, there is a need for technological solutions for flexibly and securely deploying micro services or other distributed applications in a computer environment. Such solutions should allow for micro services or other distributed applications to be individually or collectively monitored, tracked, and updated as needed. For example, such solutions should maintain metadata files for micro services or other distributed applications that describe the particular security attributes of each micro service or other distributed application. Such metadata could be used to flexibly and securely harden or otherwise modify the operation of micro services or other distributed applications.

SUMMARY

The disclosed embodiments include systems, methods, and computer readable media configured to maintain and access security metadata associated with a micro service. As discussed further below, the disclosed embodiments improve security and flexibility of computer systems by allowing micro services or other distributed applications to be individually or collectively monitored, controlled, and updated as needed.

In some disclosed embodiments, a non-transitory computer readable medium may include instructions that, when executed by at least one processor, cause the at least one processor to perform operations for maintaining and accessing security metadata associated with a micro service. The operations may comprise generating security metadata associated with a micro service, the security metadata being separate from an executable portion of the micro service and defining a plurality of security attributes of the micro service. In accordance with disclosed embodiments, the plurality of security attributes may include one or more of a security grade level for the micro service, a security sensitive operation that the micro service is programmed to perform, a function classification for the micro service, and an idempotence property for the micro service. The operations may also comprise accessing the security metadata. Further, the operations may comprise determining, based on the security metadata, whether to perform a control action for the micro service.

In additional embodiments, the security grade level defines a group of identities permitted to access the micro service.

In further embodiments, the security grade level defines a group of identities that the micro service is permitted to access.

In additional embodiments, the security grade level defines a degree of sensitivity of the micro service.

In further embodiments, the security sensitive operation defines a specific type of operation that the micro service is programmed to perform on a specific computing resource.

In additional embodiments, the function classification defines at least one of a create, read, update, or delete function for the micro service.

In further embodiments, the idempotence property defines whether the micro service can be invoked more than once without changing a state of the micro service.

In additional embodiments, the security metadata is stored separate from an executable file of the micro service.

In further embodiments, the security metadata is stored in a common arrangement that includes a plurality of sets of security metadata associated with a plurality of micro services.

In additional embodiments, the control action is performed on two or more of the plurality of micro services based on a shared attribute from the plurality of security attributes.

In further embodiments, the security metadata is invoked at runtime of the micro service.

In additional embodiments, the security metadata is invoked independent of runtime of the micro service.

Additional embodiments include a computer-implemented method for maintaining and accessing security metadata associated with a micro service. The method may comprise generating security metadata associated with a micro service, the security metadata being separate from an executable portion of the micro service and defining a plurality of security attributes of the micro service. In some embodiments, the plurality of security attributes include one or more of a security grade level for the micro service, a security sensitive operation that the micro service is programmed to perform, a function classification for the micro service, and an idempotence property for the micro service. The method may also include accessing the security metadata. Further, the method may include determining, based on the security metadata, whether to perform a control action for the micro service.

In some embodiments, the security metadata is manually generated and associated with the micro service.

In further embodiments, the security metadata is generated based on a static code analysis.

In other embodiments, the static code analysis includes scanning code associated with the micro service and identifying a keyword from the code.

In additional embodiments, the static code analysis includes determining, based on the keyword, at least one of the plurality of security attributes for the micro service.

In further embodiments, the security metadata is generated based on a dynamic behavior analysis.

In additional embodiments, the dynamic behavior analysis includes monitoring activity of the micro service and determining a pattern of activity of the micro service.

In other embodiments, the pattern of activity identifies specific functions performed by the micro service.

In further embodiments, the pattern of activity identifies specific computer resources accessed by the micro service.

In other embodiments, the pattern of activity identifies a sequence of operations performed by the micro service.

In additional embodiments, the control action includes blocking activity of the micro service.

In other embodiments, the control action includes reporting activity of the micro service for analysis of potentially malicious activity.

It is to be understood that both the foregoing general description and the following detailed description are exemplary and explanatory only and are not restrictive of the disclosed embodiments as defined in the claims.

BRIEF DESCRIPTION OF DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The disclosed embodiments provide improved techniques for maintaining and accessing security metadata associated with a micro service or other distributed application and, more particularly, systems, methods, and computer readable media for monitoring and controlling micro services or other distributed applications on an individual or collective basis using metadata for each micro service or application. The described systems, methods, and computer readable media may include various types of security information in each metadata file and use the file to perform various different control actions for each micro service or other distributed application.

Reference will now be made in detail to exemplary disclosed embodiments, examples of which are illustrated in the accompanying drawings and disclosed herein. Where convenient, the same reference numbers will be used throughout the drawings to refer to the same or like parts.

Figure 1:
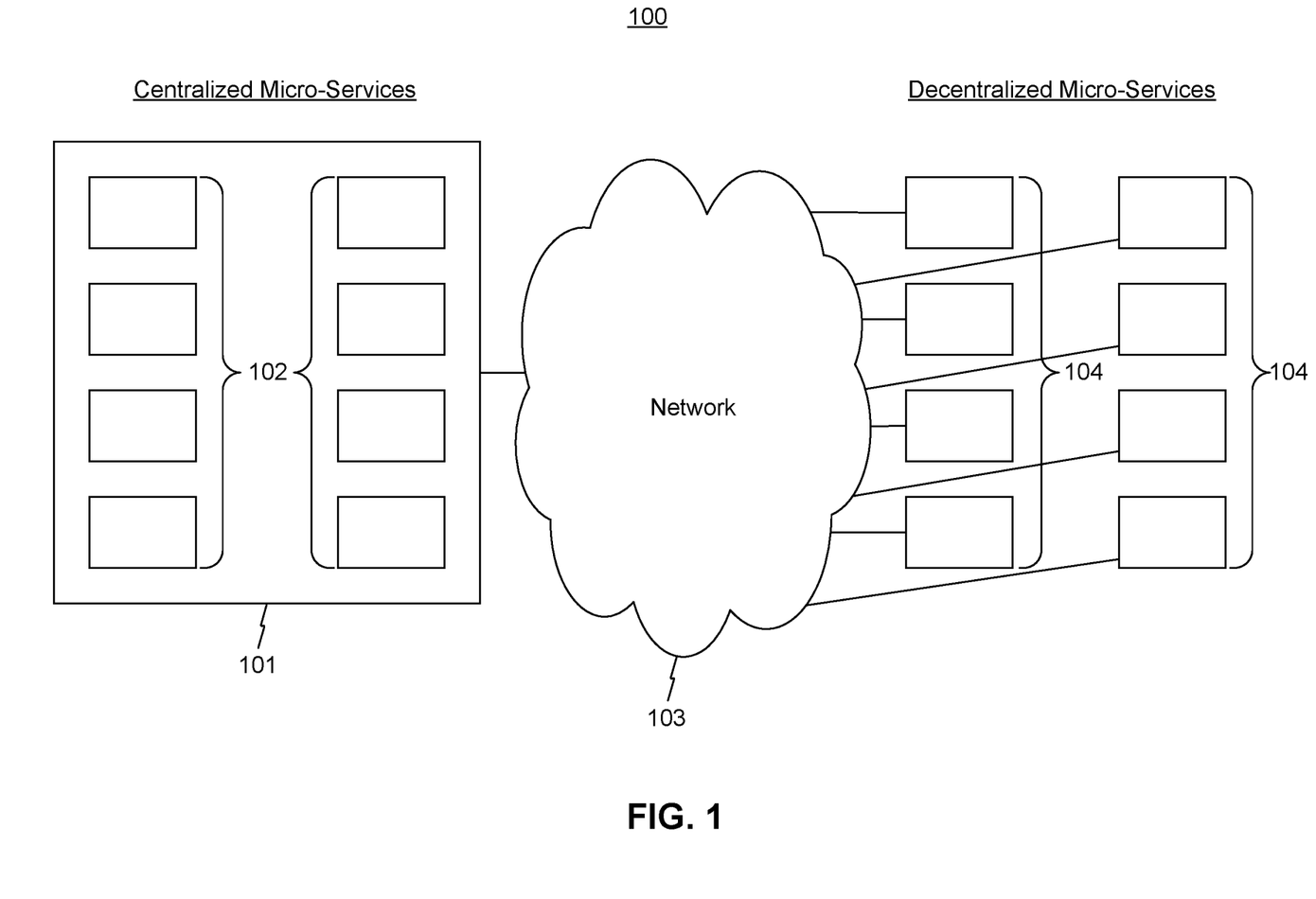
FIG. 1 is a schematic diagram of an exemplary system for maintaining and accessing security metadata associated with a micro service in accordance with disclosed embodiments.

FIG. 1 shows a diagram of an exemplary system 100 for maintaining and accessing security metadata associated with a micro service in accordance with disclosed embodiments, as discussed further below. The system 100 may include various components, including one or more client identities or machines 101, each having one or more associated micro service 102 running on the client identity or machine 101. The client identity or machine 101, and associated micro services 102, may communicate through a network 103 with other network resources. System 100 may also include decentralized micro services 104, which are not centrally located on client identity or machine 101, but instead are distributed in one or more locations, as further discussed below.

As described herein, client identities or devices 101 may be various different types of accounts or computing devices. In some embodiments, an identity 101 may be, for example, a local account on a computer or computer system that is established according to a particular operating system (e.g., Microsoft Windows®, Mac OS®, UNIX, etc.), a particular security service, or another service or protocol governing the computer or computer system. An identity 101 may also be a network account, such as an account established according to a network operating system (e.g., a Microsoft® network operating system, a Cisco® network operating system, a Dell® network operating system, a Linux network operating system, etc.). In addition, network account identities 101 may be established based on network security protocols or services. Further, identity 101 may be an instance of a virtual machine or container running in a cloud computing environment. Identity 101 may also be a token used to identify a particular computing resource, person, account, virtual machine, container, serverless code, a micro service, or an application accessing a computer or network.

As described herein, element 101 may also be a computing device of various different types, such as personal computers, laptops, web servers, general-purpose servers, authentication servers, mobile computing devices (e.g., smartphones), tablets, IoT devices, wearable computer devices, automotive computer devices, smart home appliances, etc. As discussed further below, such computing devices 101 may include hardware processors and memories for storing data and/or software instructions.

In some embodiments, the identity or machine 101 may also include one or more centralized micro services or other distributed applications 102. The micro services 102 may be centralized on identity or machine 101 in terms of running on the same physical device of identity or machine 101 or in terms of running in the same local network as identity or machine 101. Centralized micro services 102 may be configured to perform several individual functions that collectively implement an application or other service. For example, an enterprise may maintain an online portal for employee access. Different micro services 102 may be configured to perform different functions of the portal, such as a technical training function, employee directory function, human resources function, employee benefits function, payroll function, etc. As another example, a video game application may have several micro services 102 that implement its various functions, such as input/output device communications, graphics processing, audio reproduction, facial recognition, artificial intelligence functionality, database access, online communications with other players, etc. As a further example, an enterprise may have a network security platform that is comprised of several different micro services 102. In such an environment, different micro services 102 may be configured for email security, network access controls, malicious activity detection, keystroke analysis, behavioral monitoring, etc. In each of these examples, micro services 102 may be centralized on one or more machines 101 running the application or coordinating its various functions.

Alternatively, micro services 104 may perform the same functions but in a decentralized manner. Micro services 104 may be decentralized, for example, when they execute in a cloud computing environment, such as a private, public, or hybrid public-private cloud environment. In some embodiments, decentralized micro services 104 may be spun up or hosted using a cloud orchestration tool, such as Amazon Web Services CloudFormation™, Cisco Cloud Center™, IBM Cloud Orchestrator™ Microsoft Azure Automation™, OpenStack™, Dell Cloud Manager™, Kubernetes (K8S)™, OpenShift™, Docker™, Ansible™, Puppet™, Chef™, K8S™, OpenShift™, Docker™, Ansible™, and others. Similarly, micro services 104 may be decentralized when they run from disparate locations of an on-premises network. Like centralized micro services 102, however, decentralized micro services 104 may be logically organized into a single overall application that performs coordinated functions. Further, in some embodiments, micro services 102 or 104 may be parts of multiple different applications. For example, a micro service 102 or 104 that is designed to perform graphics processing may be a part of two different video games that involve different graphics.

Micro services 102 and 104 in the system 100 may be configured to communicate with one or more other components in the system 100 via a network 103. The network 103, for example, may comprise one or more interconnected wired or wireless data networks. In one aspect, the network 103 may comprise any type of computer networking arrangement used to exchange data. For example, the network 103 may be implemented using the Internet, a wired Wide Area Network (WAN), a wired Local Area Network (LAN), a wireless WAN (e.g., WiMAX), a wireless LAN (e.g., IEEE 802.11, Bluetooth, etc.), a mobile network, a private data network, a virtual private network using a public network, and/or other suitable connection (e.g., NFC, infrared, etc.) that enables the system 100 to send and receive information between the components in the system 100 (e.g., clients or machines 101, micro services 102 and 104, and other network resources).

Figure 2:
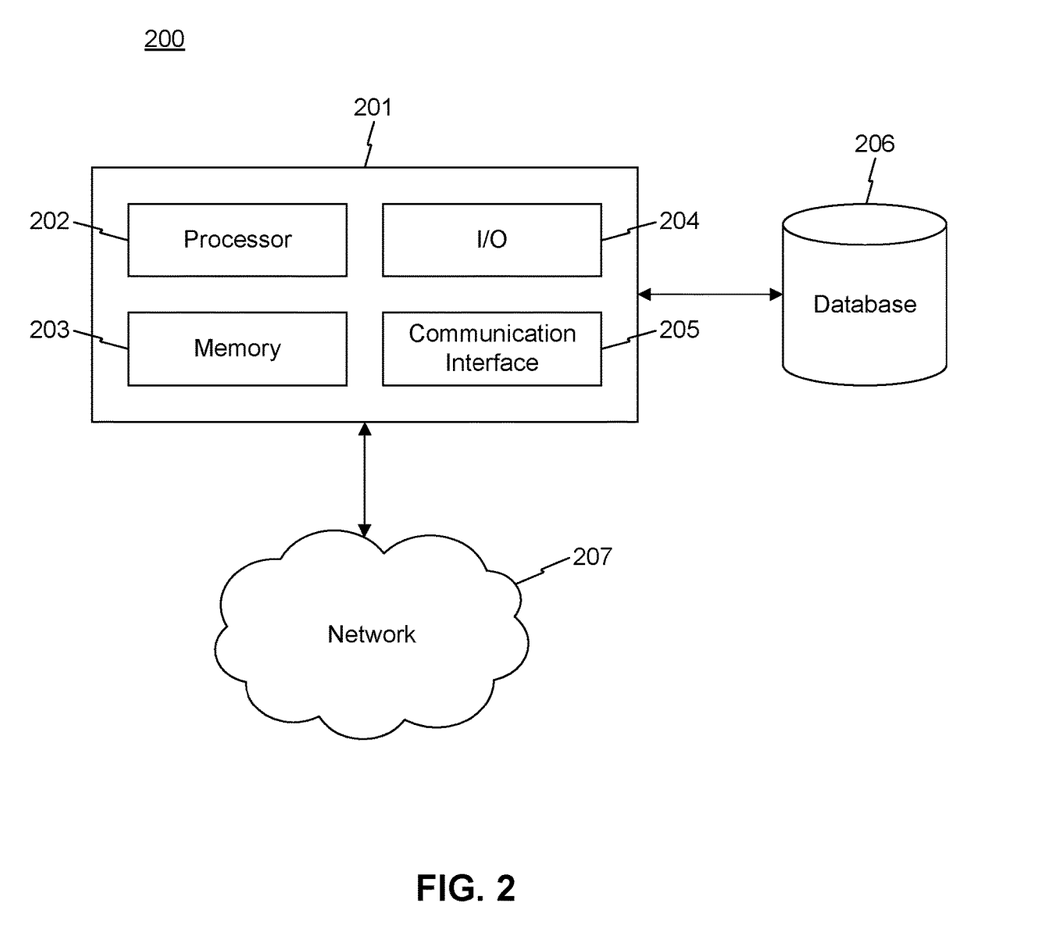
FIG. 2 is a schematic diagram of an exemplary computing device in a network in accordance with disclosed embodiments.

FIG. 7 depicts a schematic diagram 200 of an exemplary computing device 201 in accordance with disclosed embodiments. The computing device 201 may be, for example, the machine 101 discussed above. In various embodiments, the computing device 201 may connect through a network 207 (similar to network 103, discussed above) to other computing devices (e.g., other clients or machines, micro services, or other network resources). Computing device 201 may, for instance, be a personal computer, laptop, web server, file sharing server, authentication server, mobile computing device (e.g., smartphone), tablet, IoT device, wearable computer device, automotive computer device, smart home appliance, etc.

In some embodiments, computing device 201 may have one or more processors 202, one or more memories 204, one or more input/output (I/O) devices 203, and one or more communications interfaces 205. The processors 202 may be configured to control micro services, which may be centralized (e.g., stored in memory 203) or decentralized (e.g., stored elsewhere). As discussed above, computing device 201 may take the form of a mobile computing device, a personal computer, a mainframe computer, a server, or any combination of these components. Alternatively, computing device 201 may be configured as a particular apparatus, embedded system, dedicated circuit, or the like based on the storage, execution, and/or implementation of the software instructions that perform one or more operations in accordance with the disclosed embodiments. In some embodiments, computing device 201 may be a system-on-a-chip (SoC). Furthermore, computing device 201 may be a stand-alone system, or it may be implemented as a subsystem in a larger system, where one or more operations of computing device 201 are performed using parts of the larger system.

Processor(s) 202 may include one or more data or software processing devices. For example, the processor(s) 202 may take the form of, but are not limited to, a microprocessor, embedded processor, or the like, or alternatively, the processor(s) 202 may be integrated in an SoC. Furthermore, according to some embodiments, the processor(s) 202 may be from the family of processors manufactured by Intel®, AMD®, Qualcomm®, Apple®, NVIDIA®, or the like. The processor(s) 202 may also be based on the ARM architecture, a mobile processor, or a graphics processing unit, etc. The disclosed embodiments are not limited to any particular type of processor configured in the computing device 201.

Memory(ies) 203 may include one or more storage devices configured to store instructions used by the processor(s) 202 to perform functions related to the disclosed embodiments. For example, the memory 203 may be configured to store micro services as well as associated metadata, as discussed further below in detail. Memory 203 may include a single program, such as a user-level application, that performs the functions of the disclosed embodiments, or may comprise multiple software programs. Additionally, the processor 202 may execute one or more programs (or portions thereof) remotely located from the computing device 201. Furthermore, the memory 203 may include one or more storage devices configured to store data for use by the programs. In addition to memory 203, computing device 201 may have access to database 206. In some embodiments, micro services or associated metadata may be stored in database 206.

Input/output devices 204 may include one or more integrated ports or stand-alone devices configured to allow data to be received and/or transferred by the computing device 201. In some embodiments, the I/O devices 204 may comprise a touchscreen configured to allow a user to interact with the computing device 201, and in some embodiments, the I/O devices 204 may comprise a keyboard, mouse, trackball, touch pad, stylus, and the like. The I/O devices 204 may include one or more communication devices and/or interfaces (e.g., WiFi, Bluetooth®, RFID, NFC, RF, infrared, etc.) to communicate with other machines and devices, such as the components in the system 200. I/O devices 204 may also comprise sensors, such as gyroscopes, accelerometers, thermometers, cameras, scanners, etc.

Computing devices 201 in the system 200 may be configured to communicate via interface 205 with one or more components in the system 200 via a network 207. The network 207, in some embodiments, may comprise one or more interconnected wired or wireless data networks. In one aspect, the network 207 may comprise any type of computer networking arrangement used to exchange data. For example, the network 207 may be implemented using the Internet, a wired Wide Area Network (WAN), a wired Local Area Network (LAN), a wireless WAN (e.g., WiMAX), a wireless LAN (e.g., IEEE 802.11, Bluetooth, etc.), a mobile network, a private data network, a virtual private network using a public network, and/or other suitable connection (e.g., NFC, infrared, etc.) that enables the system 200 to send and receive information between the components in the system 200. Communications interface 205 may be a hardware interface or software driver configured to implement these different forms of communication. In some embodiments, computing devices 201 may connect through network 207 to other computing devices or micro services in the system 200.

It is to be understood that the configurations and boundaries of the functional building blocks shown for exemplary systems 100 and 200 have been generally described herein for the convenience of the description. Alternative implementations may be used so long as the specified functions and relationships thereof are appropriately performed and fall within the scope and spirit of the various embodiments, as discussed further below.

Figure 3:
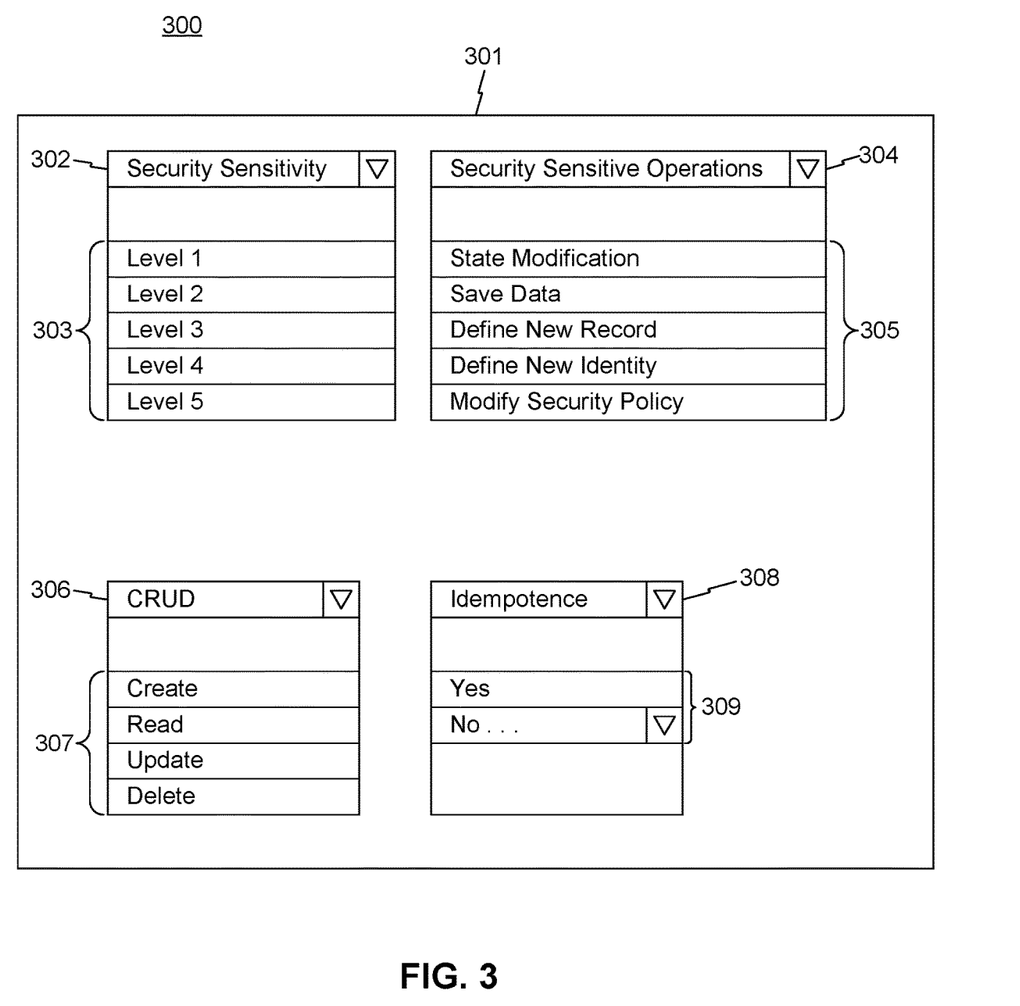
FIG. 3 is a depiction of exemplary security metadata types in accordance with disclosed embodiments.

FIG. 3 illustrates an exemplary interface 300 depicting exemplary security metadata types in accordance with disclosed embodiments. For example, the interface 300 of FIG. 3 may be displayed by, or configurable through, identity or machine 101 or computing device 201, as discussed above in connection with FIGS. 1 and 2.

As shown, interface 300 may include a configurable window 301 with various types of security metadata, such as security sensitivity levels 302, specific security sensitive operations 304, CRUD (create, read, update, and delete) functions 306, and idempotence properties 308. As discussed further below, these types of security metadata may be uniquely associated with a particular micro service or with a defined group of micro services. In some embodiments, the window 301 may display these or other types of security metadata but not allow for their modification. In other embodiments, a user (e.g., administrator or security personnel) may directly modify the security metadata through window 301.

Security sensitivity level metadata 302 may, in some embodiments, be specified in terms of different defined levels 303. Micro services may differ from one another in terms of their security sensitivity. For example, micro services that deal with confidential financial information or systems (e.g., retrieving financial data from a database) may be more secure sensitive than those that perform routine computations on publicly available data (e.g., forecasting the weather). As another example, a micro service used in a health care application may have a high level of security sensitivity if it is responsible for storing patient health data, whereas a micro service used to remind patients of upcoming appointments may have a lower level of security sensitivity. In some embodiments, different levels 303 (e.g., Level 1 through Level 5) may specify the sensitivity of a micro service's functionality. For example, Level 1 may be the most sensitive and Level 5 the least sensitive, or vice versa. Alternatively, security sensitivity levels 303 may be expressed as percentages, rankings, scores, colors, or in other forms.

Security sensitivity levels 303 may be set individually for each micro service, collectively for a defined group of micro services, or by default. For example, a security administrator may review micro services individually and manually determine a security level 303 for each micro service (or for groups of micro services deemed to be similar). Alternatively, as discussed further below, static analysis or dynamic analysis may be used to determine security sensitivity levels 303. In some embodiments, security sensitivity levels 303 are determined based on default levels associated with an application. For example, a weather forecasting application may, as a default, have a low security sensitivity level 303 for each of its constituent micro services, whereas a healthcare application may, as a default, have a high security sensitivity level 303 for each of its micro services. Default security sensitivity levels 303 may be changed from their default setting manually, through static analysis, through dynamic analysis, or through other techniques, as discussed below.

In some embodiments, specific security sensitive operations 304 may also be defined in metadata associated with a micro service. Within the category of security sensitive operations 304, the metadata may specify particular attributes 305 such as state modification, saving data, defining new data records, defining new identities, modifying security policies, and more. State modification may refer to the ability of a micro service to change its state as part of its operations. For example, a micro service may change from inactive to active, pushing data to a server to pulling data from a server, having data stored in local memory to having no data stored in local memory, having a defined date or time to having a new defined date or time, etc. Some micro services may have these forms of state changing attributes while others may not. Saving data may refer to a function of storing data locally (e.g., in memory 203 or database 206, of FIG. 2), or remotely (e.g., in a remote database or in a cloud storage system). Defining new data records may refer to the ability to define new database entries, spin up new virtual machines or containers, etc. Defining new identities may refer to a function of creating new system or network accounts, generating new authentication or authorization credentials or tokens, creating new applications, etc. An ability to modify a security policy may be a function of a micro service that operates to control network access, detect potential malicious network activity, monitor behavioral data and generate alerts, filter email messages, etc. As with security sensitivity levels 303, security sensitive operation definitions 305 may be changed from their default setting manually, through static analysis, through dynamic analysis, or through other techniques, as discussed below.

CRUD operations 306 may also be specified in metadata associated with a micro service. For example, different classifications 307 of create, read, update, and delete may be used to describe the activity or patterns of activity of a micro service. For example, a micro service responsible for turning on a light (e.g., in an IoT environment) may have a read classification, but not a create, update, or delete classification. On the other hand, a voice-operated real-time communication device may have classifications of create, read, update, and delete. In some embodiments, specific micro services may have particular patterns of CRUD classifications that they follow. For example, a home security system may follow a particular pattern of read, update, create to monitor the home and generate an alarm if a security situation is detected. Such a pattern may be specified in the metadata as well. Similar to the above types of metadata, CRUD operations 306 may be changed from their default setting manually, through static analysis, through dynamic analysis, or through other techniques, as discussed below.

In some embodiments, an idempotence property 308 of a micro service may also be identified in metadata. In some configurations, the idempotence property 308 may be a "yes" or "no" option 309. For example, a money transfer micro service may have an idempotence property 308 of "no," since each time the money transfer operation is performed, the state of the micro service (e.g., the remaining balance) changes. By contrast, a micro service that functions to replicate a virtual machine (e.g., in a scaling operation) may have an idempotence property 308 of "yes," since each time the operation is performed the identical result is achieved. In some embodiments, where the micro service is not idem potent, clicking the "No" option may further specify limits on performing the function, or new states that the micro service will have if the function is performed.

Figure 4:
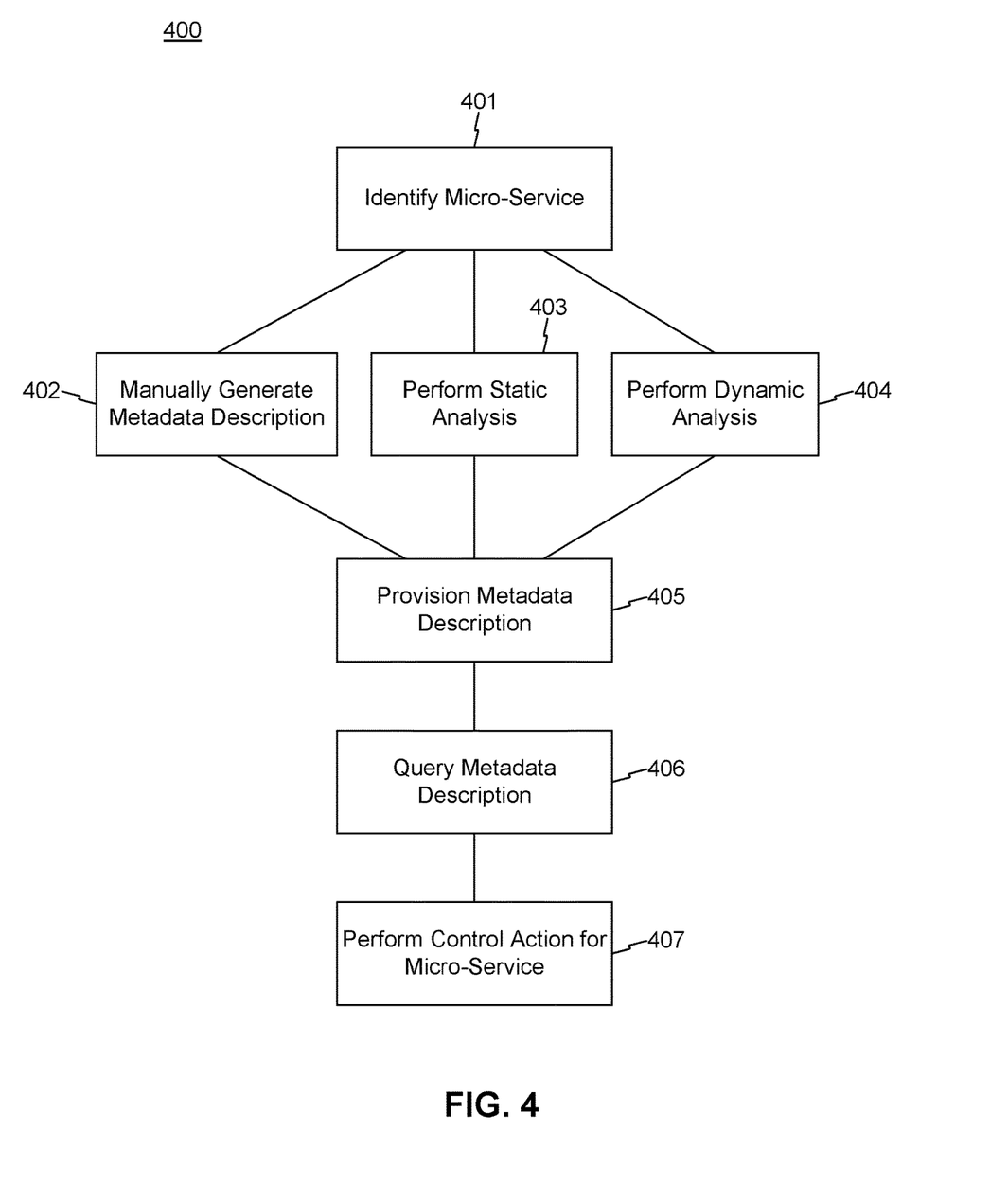
FIG. 4 is a depiction of an exemplary process for maintaining and accessing security metadata associated with a micro service in accordance with disclosed embodiments.

FIG. 4 illustrates an exemplary process 400 for maintaining and accessing security metadata associated with a micro service in accordance with disclosed embodiments. Process 400 may be performed in the environment of systems 100 or 200, as described above, and may use the metadata described in interface 300, as also described.

In an operation 401, a micro service may be identified. In different embodiments, the identification may be manual or automatic. For example, a system security administrator may analyze a micro service individually. Alternatively, micro services may be automatically identified in several ways, such as through a report from a cloud orchestration tool (e.g., AWS™, Puppet™, Chef™, or others), through a scan of a network resource registry maintained by a cloud orchestration tool or an on-premises network tool (e.g., Microsoft Active Directory™), etc. Further, in some embodiments micro services may be automatically identified based on them performing a programmed function (e.g., accessing another network resource, creating a new database record, creating a new identity, etc.). In additional embodiments, micro services may be identified by group or category. For example, micro services may be categorized based on the overall application they are associated with, based on the various types of metadata described in connection with FIG. 3 above, or in other manners.

Process 400 may also include one or more functions of generating metadata for a micro service. One example of this function, as shown in operation 402, is manually generating a metadata description for the micro service. In this manner, an administrator or security architect may consider the specific functionality of a micro service and its interactions with other applications or data, and determine what metadata it should receive. For example, such a person could assign it a security sensitivity level 302, specify the security sensitive operations 304 it performs, identify CRUD 306 operations or patterns for it, classify its idempotence 308 property, or other factors.

Another example of generating security metadata, as shown in operation 403, is to perform static analysis of the micro service. This may involve parsing the code (e.g., source code, or an abstraction of source code) of the micro service. Based on the parsing, various types of information may be used to determine the security attributes of the micro service. For example, the source code may include a specific IP address, MAC address, or machine name associated with a highly secure web development database. In that event, the static analysis may determine that the micro service should have a high security sensitivity (e.g., Level 1), has certain security sensitive operations (e.g., saving data), has certain CRUD classifications (e.g., create and read), and has an idempotence attribute. As another example, the source code may indicate that the micro service has a function of obtaining measurements of air pollution and performing a computation on the measurements. In that situation, the static analysis may determine that the micro service has a low security sensitivity (e.g., Level 5), has no security sensitive operations, has only CRUD classifications of read and update, and has an idempotence attribute. Static analysis may similarly be used in a variety of ways to parse the code of a micro service and determine what security metadata it should have. In some embodiments, this process may be facilitated through machine learning. For example, the static analysis may be used to develop a preliminary recommendation of metadata for a micro service. At that point, an administrator or other security personnel may then review the preliminary recommendation and either confirm it or make adjustments to it. Both the preliminary recommendation and the action on it (e.g., confirmation or adjustment) can be saved and used by a machine learning system to predict what actions the administrator or other security personnel will take on identical or similar micro services in the future. For example, the machine learning could predict based on the type or source of data being used by a micro service, or by the address of network resources it has permission to access, what type of metadata the micro service should receive. Based on such predictions, the accuracy of the preliminary recommendations may be improved and/or the step of manual review by the administrator may be removed.

A further option for generating metadata for a micro service is to perform dynamic analysis, as shown by operation 404. Dynamic analysis may involve monitoring the functionality of the micro service and determining what security metadata it should be assigned based on the monitored functionality. For example, a micro service may be monitored in terms of where it obtains data from (e.g., secure or insecure storage), what type of data it is obtaining (e.g., confidential or public), what credentials it has (e.g., hard-coded tokens, keys, passwords, etc.), what network resources it is configured to access (e.g., based on IP address, MAC address, or resource name), what actions it takes on data or other applications (e.g., read, write, copy, delete), what privileges it has over the functionality of other micro services, and various other functionalities. Based on the observed functionality of a micro service, its metadata can be generated in several ways.

One way is to compare the observed functionality to the known functionality of another micro service that already has metadata, and apply the metadata from the second micro service to the one being monitored. For example, observations of a micro service may indicate that it has the same pattern of accessing a database, updating the database, and connecting to a particular server as another micro service having an existing metadata security profile. In that situation, the metadata from the known micro service may be applied to the micro service being monitored. Another way is to deploy a series of rules to generate security metadata based on observed functionalities. For example, a rule may specify that whenever a micro service has an embedded cryptographic key of a particular type, the micro service is to have the highest possible security sensitivity level. Conversely, a rule may state that if a micro service has no embedded tokens or keys, it should have the lowest possible security sensitivity level. Similarly, another rule may state that if a micro service is configured to access a particular secure server, it should have the highest possible security sensitivity level. In different embodiments, rules may be assigned weights, so that combinations of different rules can produce different security metadata depending on how heavily each rule is weighted. Some rules may have an absolute weight (e.g., 100% or 1.0), while others may have a lower weight (e.g., 10% or 0.1).

Once a metadata description has been generated for a micro service (e.g., through one or more of operations 402, 403, 404), the metadata may be provisioned for the micro service in an operation 405. In some embodiments, this involves storing the metadata in the same file as the executable application code for the micro service but separately from the executable portion of the file (e.g., in a notes or comments section, in a header, in a designated metadata field, etc.). In other embodiments, the metadata may be stored on the same device (e.g., computing device 201) as the micro service by separate from a file including the micro service's application code. Alternatively, the metadata may be stored remotely (e.g., in database 206 or in remote cloud storage). In order to associate the metadata with the micro service it corresponds to, a unique identifier may be used in the metadata (e.g., a unique number, a file name of the micro service file, an IP or MAC address of the micro service, etc.), or may be used as a database key to link the metadata to the micro service.

Process 400 may also include an operation 406 of querying the metadata description that has been provisioned for a micro service. For example, the metadata may be automatically queried upon execution or runtime of the micro service, upon a specific action by the micro service (e.g., attempting to access a particular server or database, or attempting to connect to a particular IP or MAC address, etc.), or upon a potential change to the micro service (e.g., as part of a hardening operation, as discussed below). The metadata description may be queried by a security application that is configured to analyze the metadata and make decisions (e.g., whether to permit functionality of the micro service) based on the metadata. Further, the metadata description may be queried by a security application configured to perform updates or upgrades to the micro service. In other embodiments, the metadata description may be queried by a reporting or auditing application that is configured to observe the metadata descriptions of several micro services in an enterprise. In additional embodiments, such as the machine learning and dynamic analysis embodiments discussed above, the metadata description may be queried by a machine learning or analysis engine. As discussed above, the metadata description may then be confirmed (e.g., validated or changed) by security personnel, used to calibrate a series of rules designed to make preliminary recommendations about metadata for other micro services, or applied to another micro service that is deemed similar.

Process 400 may also include an operation 407 of performing a control action for a micro service based on its associated metadata description. For example, a control action may be controlling or restricting the communications capabilities of a micro service based on its security sensitivity level 302, as described in connection with FIG. 3. If a micro service has the highest security sensitivity level (e.g., Level 1), the control action may apply a whitelist of IP addresses or MAC addresses that are permitted to communicate with the micro service. Similarly, based on a Level 1 security sensitivity ranking, a micro service may be subject to an out-of-band confirmation procedure if it attempts to undertake certain highly sensitive operations (e.g., copying data, deleting data, etc.). Before such an operation is permitted by the micro service, the out-of-band confirmation process may involve inquiring with another network resource or system administrator whether the micro service is permitted to perform the operation.

Another example of a control action is monitoring the activity of a micro service. For example, if the metadata for a micro service has a security sensitive operation 304 including the function of creating new identities, the control action may be to monitor the activity of the micro service and create an audit of its activity (e.g., including date and time actions were taken, IP or MAC addresses of the micro service or identities it has created, identity names, etc.). In some embodiments, monitoring the activity of a micro service may also involve reporting the activity or audit data to a monitoring or auditing database for long-term storage or analysis.

An additional example of a control action for a micro service is to quarantine the micro service for further analysis. For example, if the metadata description for a micro service is abruptly elevated, the control action may involve quarantining the micro service until it can be further investigated. As an illustration, if a micro service with a function of querying a business intelligence server formerly had a security sensitivity level 302 of "Level 4" and is changed to "Level 1," the control action may quarantine the micro service by blocking it from receiving incoming network communications, making outgoing network communications, performing write or delete commands on data, etc.

As another example of a control action, the security metadata for a particular micro service may be modified. For example, an enterprise may maintain a metadata update policy that permits metadata for micro services to be updated at specific times (e.g., periodically or at defined times). If a micro service is determined to have its metadata updated at an unapproved or unknown time, the update may be rejected and the metadata may be reverted to a prior version. In this way, potentially malicious or improper updates to metadata may be blocked or undone. A further example of modifying metadata for a micro service is as part of a hardening process for an application or environment, as discussed further below in connection with FIG. 5.

As another example of a control action, the metadata of a micro service may be used to determine whether data needs to be sanitized. Micro services may be configured to receive, process, and communicate various types of sensitive data, such as medical data, financial data, military data, business intelligence data, etc. Based on the metadata for a micro service (e.g., its security sensitivity level 302), the micro service may or may not be permitted to access sensitive data. For example, while a micro service with a security sensitivity level of "Level 1" may be permitted to store and communicate confidential medical data of patients, micro services with a security sensitivity level of "Level 2" may not. In that situation, if a micro service with a security sensitivity level of "Level 2" is configured to receive confidential medical data, a control action may involve performing sanitization of the data before the micro service can store or process the data. The sanitization may involve, for example, deleting, anonymizing, or obfuscating personal information such as names, addresses, social security numbers, etc.

Figure 5:
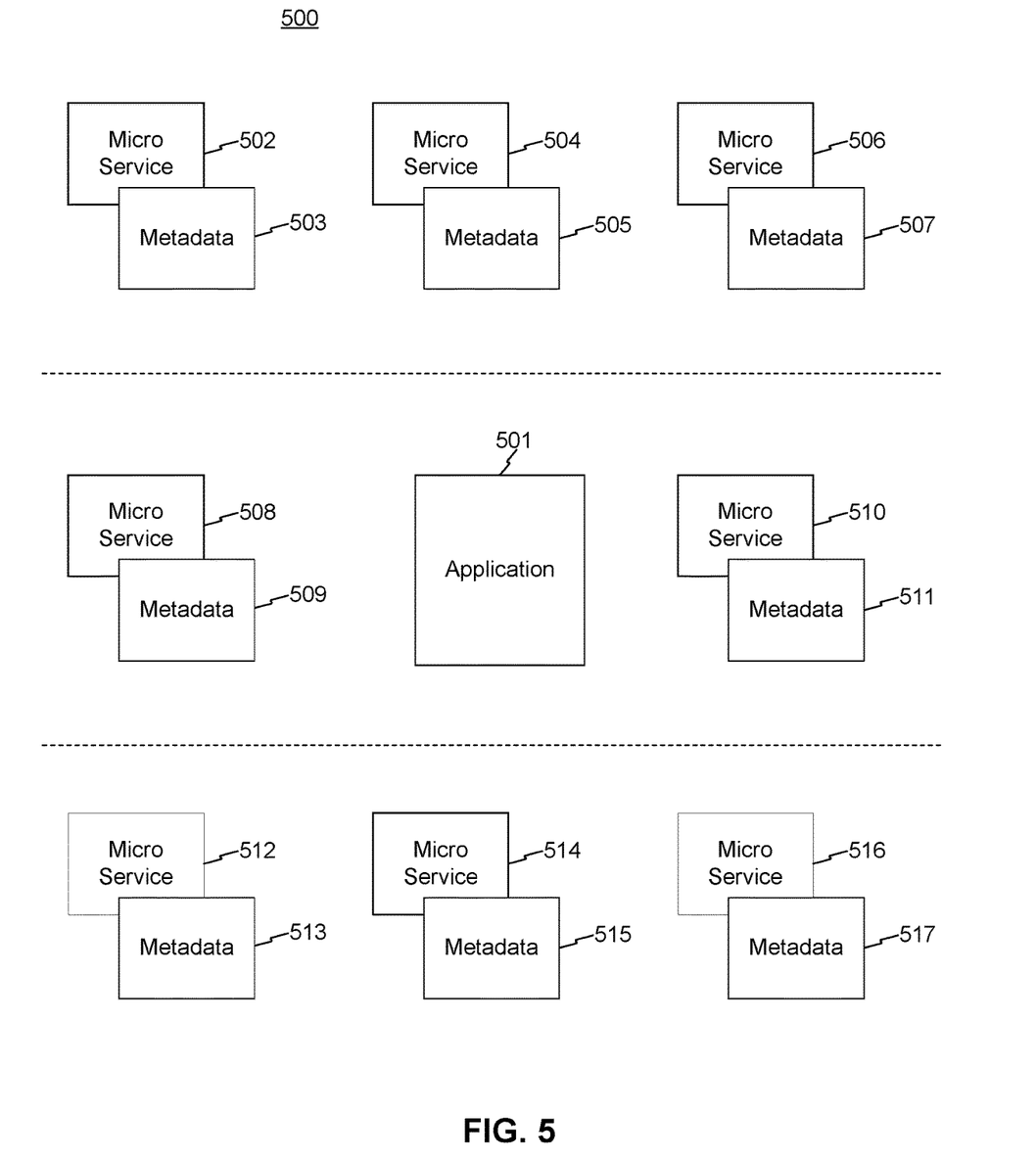
FIG. 5 is a schematic diagram of an exemplary system in which micro services have been selectively hardened in accordance with disclosed embodiments.

FIG. 5 is schematic diagram of an exemplary system 500 in which micro services have been selectively hardened in accordance with disclosed embodiments. In particular, the system 500 depicts an environment in which a main application 501 is implemented on the basis of several micro services 502, 504, 506, 508, 510, 512, 514, and 516. Each micro service 502, 504, 506, 508, 510, 512, 514, and 516 has an accompanying metadata description 503, 505, 507, 509, 511, 513, 515, and 517. The metadata descriptions 503, 505, 507, 509, 511, 513, 515, and 517 may be generated based on the techniques described above, such as in connection with operations 402, 403, or 404 of process 400, and may be provisioned as described in operation 405 of process 400.

In system 500, micro services 502, 504, 506, 508, and 510 have not been hardened, while micro services 512, 514, and 516 have been hardened. As described herein, hardening a micro service may involve enhancing one or more of its metadata security descriptions, limiting the functionality of the micro service based on its existing metadata security descriptions, or both. The need for hardening certain micro services may arise in several different ways. For example, an enterprise may detect that there is a potentially malicious actor accessing application 501 or another application that can access application 501. Alternatively, an enterprise may detect that application 501 has engaged in potentially malicious activity. Further, the need to harden micro services may arise if the nature of application 501 changes. For example, if application 501 was previously used only for maintaining a list of inventory to purchase through an e-commerce website, but will now be used to receive and process credit card information, it may be needed to harden one or more micro services on which application 501 is built. As an additional example, application 501 may be software that is running in a vehicle infotainment system. If the vehicle has a software upgrade (e.g., though a periodic upgrade or through a recall), the upgrade may call for certain of the micro services on which it is based to be hardened.

The decision to harden micro services 512, 514, and 516, but not the other micro services in system 500, may be based on several criterion. For example, the decision may be made based on a common characteristic that micro services 512, 514, and 516 share in their metadata descriptions 513, 515, and 517. An example of such a characteristic could be one or more of the security attributes described above in connection with FIG. 3. Based on such metadata descriptions, hardening of micro services 512, 514, and 516 may be done based on security level, a particular security sensitive operation, a particular CRUD category, an idempotence factor, or a combination of such factors. For example, a decision could be made to harden all micro services with a security sensitivity 302 of "Level 2" and a security sensitive operation 304 classification of at least defining new records. As discussed above, the hardening could involve elevating these types of metadata descriptions to a higher level, restricting functionality of the micro services themselves, or both.

In some embodiments, metadata descriptions may be searched to identify micro services in need of hardening. For example, enterprises may maintain rules about minimum levels of acceptable security sensitivity levels for different applications (e.g., application 501) or for individual micro services. Based on a search of metadata corresponding to micro services, the metadata may be compared to such rules to determine whether any micro services have metadata not in compliance with the rule. As an example, a rule may state that all micro services associated with application 501 must have a security sensitivity level of at least "Level 3" and may not have a CRUD classification that includes "Delete." Based on that rule, any metadata descriptions for application 501 that violate the rule may be identified. Further, as discussed above, such metadata descriptions may be updated to comply with the rule. As another example, a rule may state that all micro services associated with application 501 that have a security sensitivity level of "Level 4" or lower are not permitted to have security sensitive operations that include defining new records or defining new identities. Similarly, a search of metadata corresponding to application 501 may reveal any micro services having metadata that violates that rule. For metadata that violates the rule, changes to the metadata may be performed to render it in compliance with the rule.

Figure 6:
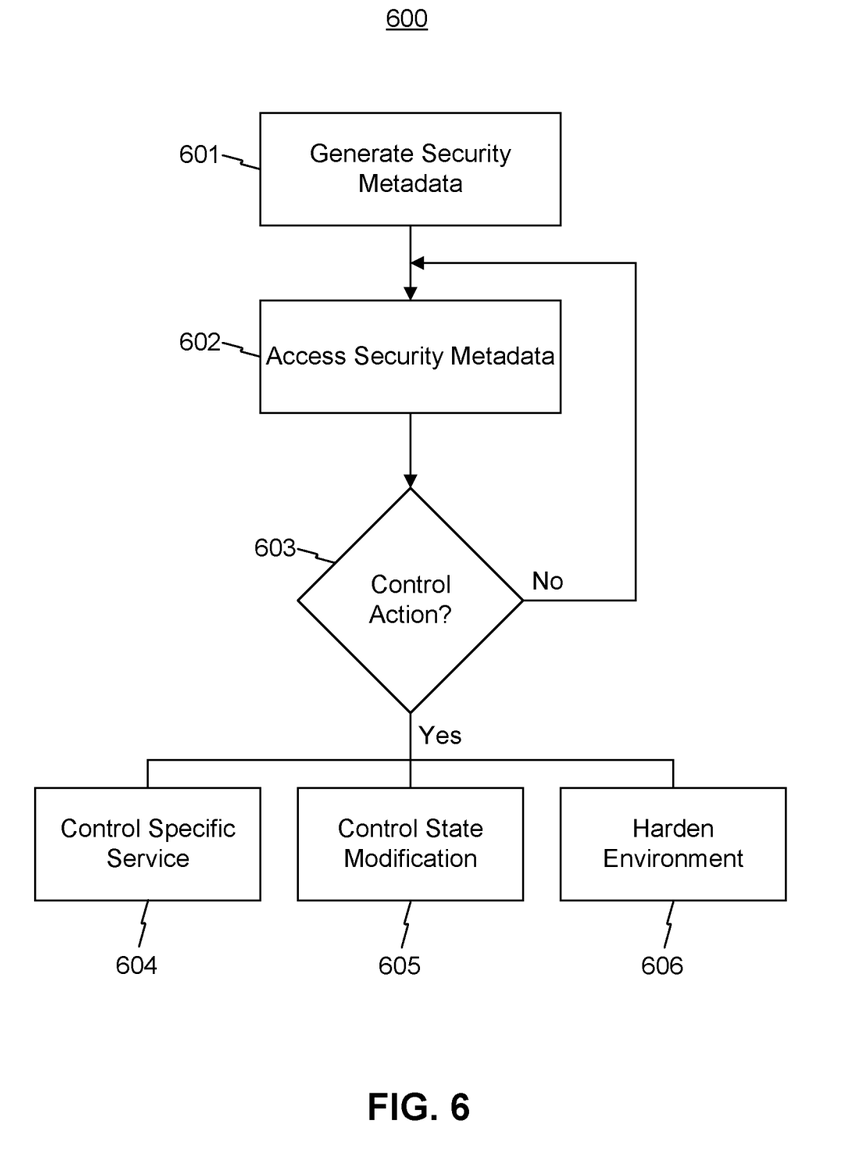
FIG. 6 is a depiction of an exemplary process for maintaining and accessing security metadata associated with a micro service in accordance with disclosed embodiments.

FIG. 6 is a depiction of an exemplary process 600 for maintaining and accessing security metadata associated with a micro service in accordance with disclosed embodiments. Process 600 may be performed in the environment of systems 100 or 200, as described above, and may use the metadata described in interface 300, as also described.

In some embodiments, process 600 may include an operation 601 of generating security metadata associated with a micro service. As discussed above, the security metadata may be separate from an executable portion of the micro service. For example, the security metadata may be stored in the same file as the file that contains the executable instructions for the micro service or separate from the file. Operation 601 may be similar to operations 402, 403, or 404, as described above in connection with FIG. 4 and the generation of security metadata. Thus, the security metadata may be generated manually, through static analysis, through dynamic analysis, or though combinations of these techniques. The security metadata may include a plurality of security attributes, such as one or more of a security grade level for the micro service, a security sensitive operation that the micro service is programmed to perform, a function classification for the micro service, or an idempotence property for the micro service, as discussed above. Once the security metadata has been generated, it may be provisioned for the micro service, as discussed above in connection with operation 405 of FIG. 4.

Process 600 may also include an operation 602 of accessing the security metadata. The security metadata may be accessed in variety of ways, as discussed above in connection with operation 406 of FIG. 4. For example, the metadata for a micro service can be accessed upon run time of the micro service, upon the micro service being created or spun up, performing or attempting to perform one of its programmed functions, accessing or attempting to access another network resource, etc.

Process 600 may also include an operation 603 of determining, based on the security metadata, whether to perform a control action for the micro service. This operation may be similar to operation 407 of FIG. 4, as discussed above. For example, the determination may be based on the current levels of the metadata for the micro service, rules defining minimum levels of security for the micro service or application, the detection of security threats relating to the micro service, the application, or the application's environment, etc.

If, in operation 603, it is determined that a control action should not be performed, process 600 may cycle back to operation 602 to once again access security metadata for a micro service and determine whether a control action should be performed. On the other, if in operation 603 it is determined that a control action should be performed, a determination may be made regarding what particular type of control action should be implemented. As discussed above in connection with operation 407 of FIG. 4, this may involve deciding whether to control the micro service or a specific function of it (operation 604), control the state modification capability of the micro service (operation 605), or harden the environment of the micro service (operation 606), among other possible control actions. As discussed above, the particular control action may be chosen based on a security policy governing the application or its environment. For example, for situations where potentially malicious activity is detected as being performed by a particular application, the application or some of its constituent micro services may be controlled in operation 604 to be quarantined or disabled. Further, in situations where a software update has been performed to an application and the update calls for micro services to be hardened, one or more micro services may be hardened in operation 606. Of course, other control actions are possible as well.

In some embodiments, control actions may be performed across two or more micro services that are deemed similar to each other. For example, a micro service for a video game application may be determined to have a security vulnerability, in response to which a hardening process may be performed for the micro service. In addition to the hardening of the particular micro service having the vulnerability, other micro services that are part of the same application, or other micro services in other similar applications, may be hardened as well. Further, if the specific cause of the security vulnerability is linked to a particular type of micro service (e.g., one that overwrites a particular type of file, resulting in a runtime error), other micro services of that particular type may be hardened as well.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for maintaining and accessing security metadata associated with a micro service, the operations comprising:
   generating a modifiable security metadata associated with the micro service, the modifiable security metadata being separate from an executable portion of the micro service and defining a plurality of security attributes of the micro service, the modifiable security metadata being based on static and dynamic analysis of source code of the micro service and an identification of a type and a number of the security attributes to include in the modifiable security metadata;
   wherein the plurality of security attributes include one or more of:
      a security grade level for the micro service,
      a security sensitive operation that the micro service is programmed to perform,
      a function classification for the micro service, and
      an idempotence property for the micro service;
   receiving an adjustment or confirmation of at least one of the plurality of security attributes;
   updating the modifiable security metadata by providing, as input, the received adjustment or confirmation to a machine learning model;
   analyzing the updated modifiable security metadata to determine whether to perform a control action for the micro service; and
   predicting, based on the machine learning model, a type of metadata used by the microservice.

2. The non-transitory computer readable medium of claim 1, wherein the security grade level defines a group of identities permitted to access the micro service.

3. The non-transitory computer readable medium of claim 1, wherein the security grade level defines a group of identities that the micro service is permitted to access.

4. The non-transitory computer readable medium of claim 1, wherein the security grade level defines a degree of sensitivity of the micro service.

5. The non-transitory computer readable medium of claim 1, wherein the security sensitive operation defines a specific type of operation that the micro service is programmed to perform on a specific computing resource.

6. The non-transitory computer readable medium of claim 1, wherein the function classification defines at least one of a create, read, update, or delete function for the micro service.

7. The non-transitory computer readable medium of claim 1, wherein the idempotence property defines whether the micro service can be invoked more than once without changing a state of the micro service. wherein the modifiable security metadata is stored separate from an executable file of the micro service.

8. The non-transitory computer readable medium of claim 1, wherein the modifiable security metadata is stored separate from an executable file of the micro service.

9. The non-transitory computer readable medium of claim 1, wherein the modifiable security metadata is stored in a common arrangement that includes a plurality of sets of security metadata associated with a plurality of micro services.

10. The non-transitory computer readable medium of claim 9, wherein the control action is performed on two or more of the plurality of micro services based on a shared attribute from the plurality of security attributes.

11. The non-transitory computer readable medium of claim 1, wherein the modifiable security metadata is invoked at runtime of the micro service.

12. The non-transitory computer readable medium of claim 1, wherein the modifiable security metadata is invoked independent of runtime of the micro service.

13. A computer-implemented method for maintaining and accessing security metadata associated with a micro service, the method comprising:
generating a modifiable security metadata associated with the micro service, the modifiable security metadata being separate from an executable portion of the micro service and defining a plurality of security attributes of the micro service, the modifiable security metadata being based on static and dynamic analysis of source code of the micro service and an identification of a type and a number of the security attributes to include in the modifiable security metadata;
wherein the plurality of security attributes include one or more of:
a security grade level for the micro service,
a security sensitive operation that the micro service is programmed to perform,
a function classification for the micro service, and
an idempotence property for the micro service;
receiving an adjustment or confirmation of at least one of the plurality of security attributes;
updating the modifiable security metadata by providing, as input, the received adjustment or confirmation to a machine learning model; analyzing the updated modifiable security metadata to determine whether to perform a control action for the micro service; and
predicting, based on the machine learning model, a type of metadata used by the micro service.

14. The computer-implemented method of claim 13, wherein the modifiable security metadata is manually generated and associated with the micro service.

15. The computer-implemented method of claim 13, wherein the static analysis includes scanning the source code and identifying a keyword from the code.

16. The computer-implemented method of claim 15, wherein the static analysis includes determining, based on the keyword, at least one of the plurality of security attributes for the micro service.

17. The computer-implemented method of claim 13, wherein the modifiable security metadata is generated based on a dynamic behavior analysis.

18. The computer-implemented method of claim 17, wherein the dynamic behavior analysis includes monitoring activity of the micro service and determining a pattern of activity of the micro service.

19. The computer-implemented method of claim 18, wherein the pattern of activity identifies specific functions performed by the micro service.

20. The computer-implemented method of claim 18, wherein the pattern of activity identifies specific computer resources accessed by the micro service.

21. The computer-implemented method of claim 18, wherein the pattern of activity identifies a sequence of operations performed by the micro service.

22. The computer-implemented method of claim 13, wherein the control action includes blocking activity of the micro service.

23. The computer-implemented method of claim 13, wherein the control action includes reporting activity of the micro service for analysis of potentially malicious activity.

* * * * *